US010511558B2

(12) United States Patent
Bellegarda

(10) Patent No.: US 10,511,558 B2
(45) Date of Patent: Dec. 17, 2019

(54) TECHNIQUES FOR AUTOMATICALLY SORTING EMAILS INTO FOLDERS

(71) Applicant: Apple Inc., Cupertino, CA (US)

(72) Inventor: Jerome R. Bellegarda, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 207 days.

(21) Appl. No.: 15/707,510

(22) Filed: Sep. 18, 2017

(65) Prior Publication Data

US 2019/0089660 A1    Mar. 21, 2019

(51) Int. Cl.
| | | |
|---|---|---|
| *G06F 17/24* | (2006.01) | |
| *H04L 12/58* | (2006.01) | |
| *G06Q 10/10* | (2012.01) | |

(52) U.S. Cl.
CPC .......... *H04L 51/12* (2013.01); *G06Q 10/107* (2013.01); *H04L 51/22* (2013.01); *H04L 51/24* (2013.01)

(58) Field of Classification Search
None
See application file for complete search history.

(56) References Cited

U.S. PATENT DOCUMENTS

| | | | |
|---|---|---|---|
| 7,702,675 B1 | 4/2010 | Khosla et al. | |
| 8,463,827 B2 | 6/2013 | Ramarao et al. | |
| 2003/0009526 A1* | 1/2003 | Bellegarda | G06Q 10/107 |
| | | | 709/206 |
| 2005/0060643 A1* | 3/2005 | Glass | G06F 17/241 |
| | | | 715/205 |
| 2005/0108322 A1* | 5/2005 | Kline | H04L 67/26 |
| | | | 709/203 |
| 2006/0206574 A1* | 9/2006 | Bellegarda | G06Q 10/107 |
| | | | 709/206 |
| 2007/0078653 A1* | 4/2007 | Olsen | G10L 15/197 |
| | | | 704/240 |
| 2012/0016821 A1* | 1/2012 | Kobayashi | G06F 17/277 |
| | | | 706/12 |
| 2012/0284273 A1 | 11/2012 | Keohane et al. | |

(Continued)

OTHER PUBLICATIONS

Bellegarda, Jerome R. "Exploiting Latent Semantic Information in Statistical Language Modeling" Proceedings of the IEEE, vol. 88, No. 8, Aug. 2000, pp. 1279-1296.

(Continued)

*Primary Examiner* — Natisha D Cox
(74) *Attorney, Agent, or Firm* — Dickinson Wright RLLP

(57) ABSTRACT

The embodiments set forth techniques for sorting emails within an email application. The technique can include: (1) accessing a plurality of emails, where each email is included in a respective folder of one or more folders, (2) establishing a set of n-grams based on the plurality of emails, (3) for each n-gram in the set of n-grams: calculating a respective normalized entropy for the n-gram, and calculating a respective indexing power for the n-gram based on its respective normalized entropy, (4) ranking the n-grams based on their respective indexing powers to establish a ranked list of n-grams, and (5) establishing, for each folder of the one or more folders, a respective set of high-value n-grams based on the ranked list of n-grams. In turn, the high-value n-grams can be compared against n-grams of a new email to identify a target folder into which the new email should be sorted.

20 Claims, 14 Drawing Sheets

(56) References Cited

U.S. PATENT DOCUMENTS

2014/0280616 A1    9/2014  Ramanathan et al.
2016/0140222 A1    5/2016  Thapliyal et al.
2016/0306862 A1*  10/2016  Sitsky .................. G06F 16/254
2018/0159744 A1*   6/2018  Tee ....................... H04L 41/147

OTHER PUBLICATIONS

Lin, et al. "Automatic Evaluation of Summaries Using N-gram Co-Occurrence Statistics", Proceedings of the Human Technology Conference 2003 (May 27-Jun. 1, 2003), Edmonton, CA (8 pages).

* cited by examiner

Example Step 1 – Evaluating the n-gram 'consumer drone' in a first folder named 'Drones':

*FIG. 6A*

Example Step 1.5 – Evaluating the n-gram 'consumer drone' in second / third folders named 'Real Estate' / 'Cycling':

607

☒ *Mail Application*

| Inbox (0) | Adam S. | August 1, 2017 at 12:12PM |
|---|---|---|
| Sent (4) | House on Walnut St. | |
| Trash (0) | To: JohnSmith@Domain.Com | |
| ▼ Folders | Adam S.<br>House on Walnut St.<br>Have you posted pictures for your listing ... | Have you posted any pictures for your listing on *Walnut*? I can stop by between my open houses today and take a few exterior / interior shots if that's helpful. Count 608 {0} |
| | Nancy M.<br>Cambridge St. Disclosures<br>Hi John, attached are the disclosures for... | It's always better to post these online before you hold the open house! |
| | Tracy H.<br>New Fax #<br>The new office fax line is 111-222-3333. | Let me know, |
| Drones (2) | | Adam |
| Real Estate (3) | | |
| Cycling (1) | | |

609

☒ *Mail Application*

| Inbox (0) | Greg T. | August 17, 2017 at 10:49AM |
|---|---|---|
| Sent (4) | Road bike this weekend? | |
| Trash (0) | To: JohnSmith@Domain.Com | |
| ▼ Folders | Greg T.<br>Road bike this weekend?<br>Let's do something shorter, like Hawk ... | Let's road bike something shorter, like Hawk Hill, then grab breakfast over in Tiburon. Or, let me know if you want to mountain bike instead. |
| | Count 610 {0} | |
| Drones (2) | | |
| Real Estate (3) | | |
| Cycling (1) | | |

*FIG. 6B*

Example Step 2 – Calculating a normalized entropy for the n-gram 'consumer drone':

$$\mathcal{E}_i = -\frac{1}{\log K} \sum_{k=1}^{K} \frac{C_{i,k}}{t_i} \log \frac{C_{i,k}}{t_i}$$

- $\{3 \text{ Total Folders}\}$
- $\begin{bmatrix} 5 \text{ Instances in 'Drones' } (k=1) \\ 0 \text{ Instances in 'Real Estate' } (k=2) \\ 0 \text{ Instances in 'Cycling' } (k=3) \end{bmatrix}$
- $\{3 \text{ Total Folders}\}$
- $\{5 \text{ Total Instances Across All Folders}\}$
- $\mathcal{E}_i \rightarrow \{0\}$ Example Step 3 – Calculating an indexing power $\pi$ for the n-gram 'consumer drone':

$$\pi_i = 1 - \mathcal{E}_i$$

- $\pi_i \rightarrow \{1\}$
- $\mathcal{E}_i \leftarrow \{0\}$
- Remains after truncation of sorted indexing powers for all n-grams.

Example Step 4 – Assigning the n-gram 'consumer drone' as a high-value n-gram to the folder 'Drones':

$$H_k = \{h_{ik}\}, N_k = |H_k|$$

- $H_k$ — 'Drones' (k=1)
- $h_{ik}$ — 'consumer drone'
- $N_k \leftarrow \{1\}$

FIG. 6C

Example Step 5 – Receiving a new email that includes the n-gram 'consumer drone':

Example Step 6 – Identifying that the n-gram 'consumer drone' is a high-value n-gram and place it into a set $Q$:

$$Q = \{h_q\}$$
↑
'consumer drone'

Example Step 7 – Calculating an affinity score between the set $Q$ and the set of high-value n-grams $H_k$ for each folder $k$, where $I_{h_q} = h_k = 1$ when the n-gram 'consumer drone' is present in both $Q$ and $H_K$, and $I_{h_q} = h_k = 0$ otherwise:

'Drones' (k = 1) → {consumer drone}

$$\{1\} \rightarrow A(H_k, Q) = \frac{1}{N_k} \underbrace{\sum_{h_{ik} \in H_k}^{K} \sum_{h_q \in Q}^{K} I_{h_q} = h_{ik}}_{\{1\}} \rightarrow \{1\}$$

'Real Estate' (k = 2) → {consumer drone}

$$\{0\} \rightarrow A(H_k, Q) = \frac{1}{N_k} \underbrace{\sum_{h_{ik} \in H_k}^{K} \sum_{h_q \in Q}^{K} I_{h_q} = h_{ik}}_{\{0\}} \rightarrow \{0\}$$

'Cycling' (k = 3) → {consumer drone}

$$\{0\} \rightarrow A(H_k, Q) = \frac{1}{N_k} \underbrace{\sum_{h_{ik} \in H_k}^{K} \sum_{h_q \in Q}^{K} I_{h_q} = h_{ik}}_{\{0\}} \rightarrow \{0\}$$

*FIG. 6E*

Example Step 8 – Sort the new email to the folder 'Drones' in accordance with its strongest affinity score:

| | | | |
|---|---|---|---|
| Inbox (0) | Drone Weekly<br>August 14, 2017 Newsletter<br>Organizations representing manufacturers ... | The Drone Hobbyist<br>Subscription Confirmed<br>To: JohnSmith@Domain.Com | August 18, 2017 at 4:19PM — 613 |
| Sent (4) | | | |
| Trash (0) | Drone Weekly<br>August 7, 2017 Newsletter<br>This week, we discuss advancements in ... | Thank you for subscribing to our mailing list! | |
| ▼ Folders | | We will send you daily emails on the following topics: Consumer Drone Reviews, and Drone Piloting Techniques. | |
| Drones (3) | The Drone Hobbyist<br>Subscription Confirmed<br>Thank you for subscribing to our mailing ... | | |
| Real Estate (3) | | You can <u>unsubscribe</u> to this mailing list any time. | |
| Cycling (1) | | Thank you! | |

*FIG. 6F*

Example Step 9 – Receive a new email that includes at least one unseen n-gram (during training) whose count exceeds a threshold:

| Inbox (1) | Ulrich S. | August 18, 2017 at 4:19PM |
|---|---|---|
| Sent (4) | Mexico Trip Planning | |
| Trash (0) | To: JohnSmith@Domain.Com; StephanieSmith@Domain.Com; SarahS@Domain.Com | |
| ▶ Folders | Hi All! | Count 616 {4} — 615 |
| Drones (3) | I wanted to start a thread for our upcoming Mexico trip! | |
| Real Estate (3) | The house rental is confirmed, so let's figure out a plan for groceries for the week. Also, every Mexico trip we've been on in the past had plenty to offer in terms of excursions, so we should plan some of those as well. | |
| Cycling (1) | Looking forward to making this the most memorable Mexico trip ever! | |

Example Step 10 – Display a prompt to create a new folder 'Mexico Trip' based on the at least one unseen n-gram:

| Inbox (1) | Ulrich S. | August 18, 2017 at 4:19PM |
|---|---|---|
| Sent (4) | Mexico Trip Pla | ; SarahS@Domain.Com |
| Trash (0) | Hi All! I wanted | |
| ▶ Folders | New Folder Suggestion — 617 | g Mexico trip! |
| Drones (3) | Would you like to create a new folder titled 'Mexico Trip' based on this email? | ure out a plan for groceries for been on in the past had plenty to plan some of those as well. |
| Real Estate (3) | [ Yes ]  [ Yes + Rename ]  [ No ] | |
| Cycling (1) | Settings | Looking forward to making this the most memorable Mexico trip ever! |

*FIG. 6G*

Example Step 11 – Receive an approval to create the new folder 'Mexico Trip':

⸺ 619

| Inbox (1) | Ulrich S.<br>Mexico Trip Pla | Ulrich S. | | August 18, 2017 at 4:19PM |
|---|---|---|---|---|
| Sent (4) | Hi All! I wanted | | ; SarahS@Domain.Com | |
| Trash (0) | | New Folder Suggestion | g Mexico trip! | |
| ▼ Folders | | Would you like to create a new folder titled 'Mexico Trip' based on this email? | gure out a plan for groceries for been on in the past had plenty to plan some of those as well. | |
| Drones (3) | | | | |
| Real Estate (3) | | [ Yes ]  [ Yes + Rename ]  [ No ] | | |
| Cycling (1) | | | | |
| Mexico Trip (1) | | | Looking forward to making this the most memorable Mexico trip ever! | |

Example Step 12 – Route the new email into the new folder 'Mexico Trip':

⸺ 621

| Inbox (0) | Ulrich S.<br>Mexico Trip Planning | Ulrich S. | August 18, 2017 at 4:19PM |
|---|---|---|---|
| Sent (4) | Hi All! I wanted to start a thread for our ... | Mexico Trip Planning | |
| Trash (0) | | To: JohnSmith@Domain.Com; StephanieSmith@Domain.Com; SarahS@Domain.Com | |
| ▼ Folders | | Hi All! | |
| Drones (3) | | I wanted to start a thread for our upcoming Mexico trip! | |
| Real Estate (3) | | The house rental is confirmed, so let's figure out a plan for groceries for the week. Also, every Mexico trip we've been on in the past had plenty to offer in terms of excursions, so we should plan some of those as well. | |
| Cycling (1) | | | |
| Mexico Trip (1) | | Looking forward to making this the most memorable Mexico trip ever! | |

*FIG. 6H*

TECHNIQUES FOR AUTOMATICALLY SORTING EMAILS INTO FOLDERS

FIELD

The described embodiments relate generally to email organization. More particularly, the described embodiments provide an efficient approach for automatically sorting emails into folders within an email application.

BACKGROUND

Emails have been adopted as a primary way for individuals to communicate with one another. It some cases, it can be common for a given individual to receive tens or even hundreds of emails every day, where it is desirable to maintain many of the emails in a permanent capacity. To manage this amount of information, the individual often attempts to manually sort their emails into different folders (e.g., "friends", "vacation", "work", etc.), such that each respective folder serves as a catch-all for certain types of emails. In most cases, the individual starts out with a simple folder structure into which it is reasonably manageable to sort existing/new emails. However, the overall complexity of the folder structure tends to increase over time, such that it becomes difficult for the individual to navigate this ever-expanding—and often overlapping—collection of folders. Consequently, the individual often gives up altogether on the folder-based organization approach, and instead merely retains all of their emails within their primary inbox. As a result, the individual must resort to utilizing built-in search features when attempting to locate emails of interest, which can be cumbersome and ineffective in comparison to an efficient procedure that otherwise could be utilized if the folder-based organizational approach were actively maintained.

Consequently, there exists a need for a technique for organizing a given individual's emails in an efficient and meaningful manner.

SUMMARY

Various embodiments set forth herein disclose techniques for automatically sorting emails into one or more folders managed by an email application.

In an embodiment, the email application can be configured to carry out an initial training process in which each email is analyzed on an n-gram basis relative to (i) other emails, and (ii) the folders in which the emails are stored. According to some embodiments, the initial training process can include the steps of (1) accessing a plurality of emails, where each email is included in a respective folder of the one or more folders, (2) establishing a set of n-grams based on the plurality of emails, (3) for each n-gram in the set of n-grams: calculating a respective normalized entropy for the n-gram, and calculating a respective indexing power for the n-gram based on its respective normalized entropy, (4) ranking the n-grams based on their respective indexing powers to establish a ranked list of n-grams, and (5) establishing, for each folder of the one or more folders, a respective set of high-value n-grams based on the ranked list of n-grams.

Subsequently, the high-value n-grams (of each folder) can be compared against n-grams of a new email to identify a target folder into which the new email should be sorted. For example, the method can further include the steps of (6) receiving the new email, (7) establishing a second set of n-grams based on the new email, (8) establishing, for the new email, a set of high-value n-grams based on an intersection of (i) the second set of n-grams based on the new email, and (ii) the respective sets of high-value n-grams for the one or more folders, (9) establishing, for each folder, a respective affinity score based on (i) the respective set of high-value n-grams for the folder, and (ii) the set of high-value n-grams for the new email, (10) identifying a target folder among the one or more folders having a strongest affinity score, and (11) in response to identifying that the strongest affinity score satisfies a first threshold value: associating the new email with the target folder.

Additionally, when a target folder is not identified—e.g., when the strongest affinity score does not satisfy the first threshold value—the n-grams of the new email can be utilized to potentially suggest the creation of a new folder into which the new email can be sorted. In particular, the method can further include (12) establishing a third set of n-grams that are (i) included in the new email, but (ii) were not identified during the training process, and (13) in response to identifying, among the third set of n-grams, that at least one n-gram is observed within the new email a number of times that satisfies a second threshold value: issuing a prompt to create a new folder into which the new email can be placed, where the a name for the new folder is based on the at least one n-gram. In turn, a user can accept or deny the prompt.

Other embodiments include a non-transitory computer readable storage medium configured to store instructions that, when executed by a processor included in a computing device, cause the computing device to carry out the various steps of any of the foregoing methods. Further embodiments include a computing device that is configured to carry out the various steps of any of the foregoing methods.

Other aspects and advantages of the invention will become apparent from the following detailed description taken in conjunction with the accompanying drawings that illustrate, by way of example, the principles of the described embodiments. Moreover, the order of operations can take place in a different order than provided in the examples. For example, operations can occur in parallel.

BRIEF DESCRIPTION OF THE DRAWINGS

The disclosure will be readily understood by the following detailed description in conjunction with the accompanying drawings, wherein like reference numerals designate like structural elements.

FIGS. 6A-6H illustrate conceptual diagrams of example scenarios in which the various training, sorting, and new folder suggestion processes described herein can be practiced, according to some embodiments.

DETAILED DESCRIPTION

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

The embodiments described herein set forth techniques for automatically sorting emails into one or more folders managed by an email application or other software. According to some embodiments, the email application, or other software, can be configured to carry out an initial training process in which each email already sorted into one or more folders is analyzed on an n-gram basis relative to other emails/the folders in which the emails are sorted. In particular, the email application can identify, for each folder, a set of high-value n-grams by analyzing the overall frequency and distribution of the n-grams relative to the other folders. Subsequently, the high-value n-grams can be compared against the n-grams of a new email to identify one or more target folders—if any—into which the new email should be sorted. Additionally, when at least one target folder is not identified, the n-grams of the new email can be utilized to potentially suggest the creation of a new folder into which the new email can be sorted.

A more detailed discussion of these techniques is set forth below and described in conjunction with FIGS. 1-5, 6A-6H, and 7, which illustrate detailed diagrams of systems and methods that can be used to implement these techniques.

Figure 1:
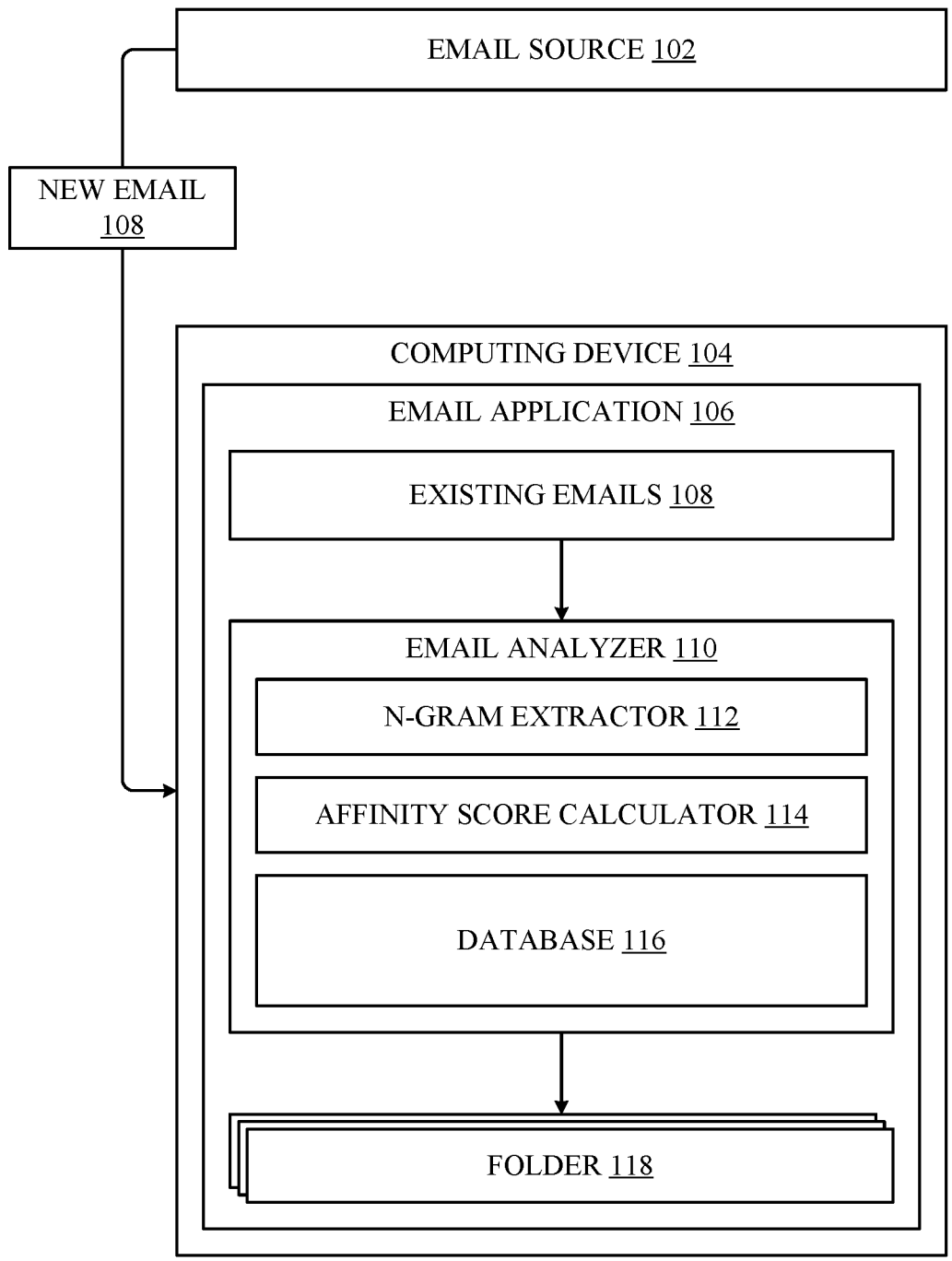
FIG. 1 illustrates a block diagram of different computing devices that can be configured to implement different aspects of the various techniques described herein, according to some embodiments.

FIG. 1 illustrates a block diagram 100 of a computing device 104 that can be configured to implement various aspects of the techniques described herein, according to some embodiments. Although not illustrated in FIG. 1, it is understood that the computing device 104 can include at least one processor, at least one memory, and at least one storage device that collectively enable the computing device 104 to implement the various techniques set forth throughout this disclosure. For example, instructions for various software components—e.g., an email application 106—can be stored in the at least one storage device, and loaded into the at least one memory for execution by the at least one processor to enable the computing device 104 to implement the various techniques described herein. It is understood that these software components can also be split apart into different components—or merged together into fewer components—without departing from the scope of this disclosure, as described below in greater detail.

As shown in FIG. 1, the email application 106 can be configured to implement an email analyzer 110 that (1) processes existing emails 108 managed by the email application 106 during a training process, and (2) new emails 108 received from an email source 102 (e.g., an email server/provider) during a sorting process. According to some embodiments, an n-gram extractor 112 can carry out the training process, which involves analyzing existing emails 108 stored across different folders 118 to identify high-value n-grams for the different folders 118 that can be utilized when carrying out the sorting process. According to some embodiments, the high-value n-grams—as well as other information (e.g., low-value n-grams)—can be stored within a database 116 that is accessible to the email analyzer 110. A more detailed explanation of the training process is provided below in conjunction with FIGS. 2, 3, and 6A-6C. Additionally, the n-gram extractor 112 and an affinity score calculator 114 can carry out the sorting process, which involves identifying appropriate folders 118—if any—as candidates into which new emails 108 should be sorted as they are received. A more detailed explanation of the sorting process is provided below in conjunction with FIGS. 2, 4, and 6D-6F. Additionally, the affinity score calculator 114 can be configured to carry out a new folder suggestion process, which involves suggesting the creation of a new folder 118 in response to receiving a new email 108 that satisfies particular conditions. A more detailed explanation of the new folder suggestion process is provided below in conjunction with FIGS. 2, 5, and 6G-6H.

Figure 2:
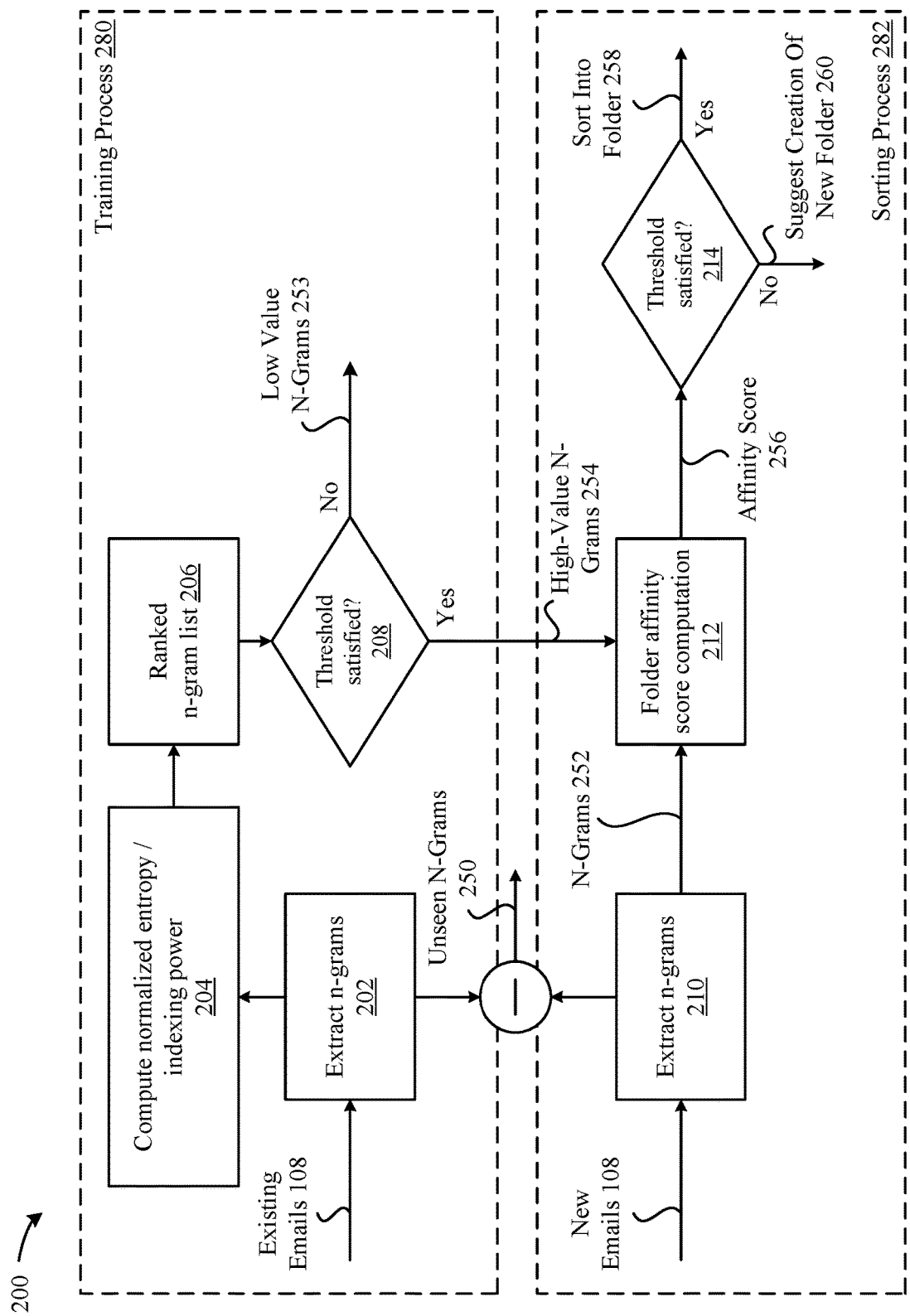
FIG. 2 illustrates a high-level overview of how a training process, a sorting process, and a new folder suggestion process can be implemented and interact with one another, according to some embodiments.

FIG. 2 illustrates a high-level overview 200 of how the training, sorting, and new folder suggestion processes described herein can be implemented and interact with one another, according to some embodiments. As shown in FIG. 2, a training process 280 can begin with a step 202 that involves extracting n-grams from existing emails 108. Moreover, the training process 280 can continue with a step 204 that involves computing normalized entropies/indexing powers for the n-grams extracted from the existing emails 108. Additionally, the training process 280 can continue with steps 206 and 208, which involve (1) establishing a ranked n-gram list (based on the computed normalized entropies/indexing powers), and (2) truncating the ranked n-gram list in accordance with a threshold. In turn, the n-grams truncated from the ranked n-gram list are deemed low value n-grams 253, and the n-grams that remain in the truncated ranked n-gram list are deemed high-value n-grams 254. Accordingly, at the conclusion of step 208 of the training process 280, there exists a collection of high-value n-grams 254 that can be utilized, in part, by a sorting process 282 that identifies appropriate folders 118—if any—into which new emails 108 can be sorted.

According to some embodiments, and as shown in FIG. 2, a step 210 of the sorting process 282 can involve extracting n-grams 252 from a new email 108, e.g., a new email 108 that is received subsequent to the training process 280 being carried out at least one time. Although not shown in FIG. 2, the n-grams 252 can be filtered to include only n-grams that are also included in the high-value n-grams 254. For example, the sorting process 282 can involve identifying unseen n-grams 250—i.e., n-grams included in the new email 108, but not seen during training—thereby further enabling the filtration of the n-grams 252. In turn, a step 212 of the sorting process 282 can involve performing an affinity computation, where the high-value n-grams 254 are compared against the filtered n-grams 252 to identify an appropriate folder 118 having a highest affinity score 256. Next, a step 214 of the sorting process 282 can involve identifying whether the highest affinity score 256 satisfies a threshold, which can help to avoid incorrectly sorting the new email 108 into an irrelevant folder 118. Accordingly, when the condition of step 214 is true, a step 258 can be carried out, which involves sorting the new email 108 into the folder 118 having the highest affinity score 256. Otherwise, when the condition of step 214 is false, a step 260 can be carried out, which involves suggesting the creation of a new folder 118 into which the new email 108 can potentially be sorted.

Accordingly, FIG. 2 provides a high-level overview 200 of how the training, sorting, and new folder suggestion processes described herein can interact with one another and be carried out. A more detailed explanation of these various processes will now be provided below in conjunction with FIGS. 3-5 and 6A-6H.

Figure 3:
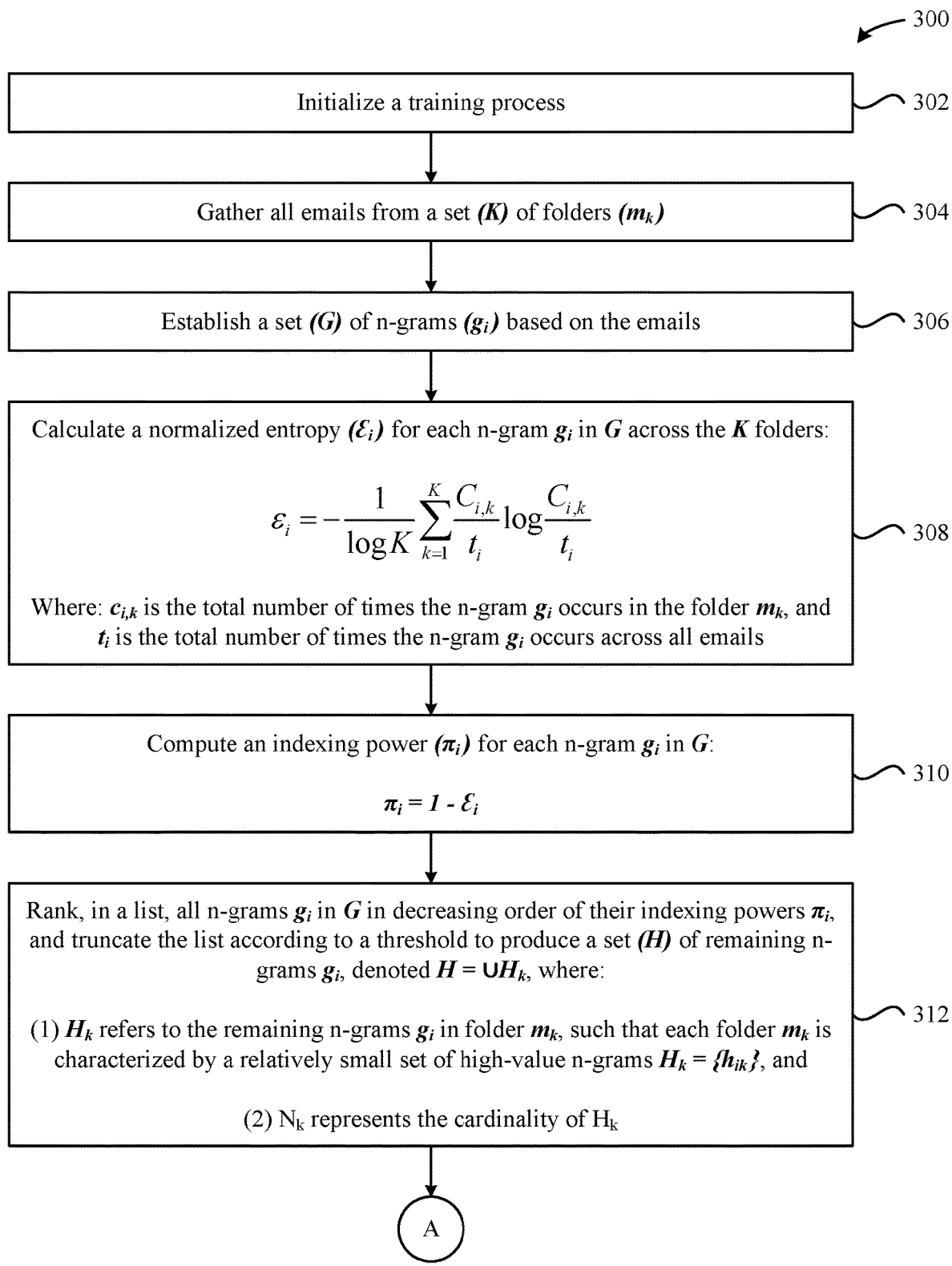
FIG. 3 illustrates a method for carrying out a training process, according to some embodiments.

FIG. 3 illustrates a method 300 for carrying out the training process described herein, according to some embodiments. As shown in FIG. 3, the method 300 begins at step 302, where the email application 106 initializes the training process. According to some embodiments, the email application 106 can be configured to initialize the training process in accordance with a variety of conditions being satisfied. For example, the training process can be initialized when a threshold number of emails 108 have been sorted into at least one folder 118. In another example, the training process can be initialized based on time intervals, e.g., to periodically refresh the database 116 so that the processed n-grams reflect the overall state of the emails 108/folders 118 managed by the email application 106. In any case, at step 304, the email application 106 gathers all emails 108 from a set (K) of folders 118 ($m_k$). According to some embodiments, at step 304, the email application 106 can disregard emails 108 that are stored in generic folders 118—e.g., inbox, sent items, etc.—and process only emails 108 that have been sorted into folders 118. In this manner, the email application 106 can focus on existing and meaningful relational data between the emails 108 and the folders 118 to improve the overall accuracy of the techniques described herein.

At step 306, the email application 106 establishes a set (G) of n-grams ($g_i$) based on the emails 108. According to some embodiments, the n-grams can be bound such that desirable performance metrics are met. For example, the email application 106 can be configured to extract n-grams containing one, two, three, and four words (or other number) from each email 108, which helps avoid placing a burden on consumer-based hardware (e.g., smart phones, tablets, laptops, desktops, etc.) when performing the extraction. It is noted that such an approach is merely exemplary, and that the n-gram extraction processes described herein can be fine-tuned to achieve different results. For example, n-grams with lower word counts can be utilized to improve processing performance, however this typically comes at a cost of reducing the overall accuracy of the sorting process described herein. In another example, n-grams with higher word counts can be utilized to improve the overall accuracy of the sorting process described herein, however this typically comes at a cost of reduced processing performance. It is noted that the n-grams can be extracted from any portion of the emails 108, e.g., primary recipients, carbon copy recipients, blind carbon copy recipients, subjects, bodies, and so on. Moreover, the n-grams can be extracted from any attachments included in the emails 108. For example, the email application 106 can be configured to parse filenames, metadata, and content of email 108 attachments when performing the n-gram extraction techniques set forth herein.

In any case, at step 308, the email application 106 calculates a normalized entropy ($\varepsilon_i$) for each n-gram $g_i$ in G across the set K of folders 118 in accordance with the equation illustrated within step 308 of FIG. 3. In particular, within the context of the equation illustrated within step 308 of FIG. 3, (1) $c_{i,k}$ is the total number of times the n-gram $g_i$ occurs in the folder 118 $m_k$, and (2) $t_i$ is the total number of times the n-gram $g_i$ occurs across all emails. It is noted that the equation illustrated within step 308 of FIG. 3 is merely exemplary, and that this equation can be modified in any manner—including adding, modifying, and removing elements—without departing from the scope of this disclosure. In any case, by the design of the equation, the normalized entropy $\varepsilon_i$ for each n-gram $g_i$ in G takes on a value that is greater than or equal to zero (0), and less than or equal to one (1) (i.e., $0 \leq \varepsilon_i \leq 1$). In this manner, for a given n-gram $g_i$, a value of $\varepsilon_i$ close to one (1) indicates that the n-gram $g_i$ is distributed across many folders 118. In contrast, for a given n-gram $g_i$, a value of $\varepsilon_i$ close to zero (0) indicates that the n-gram $g_i$ is essentially present in only a single folder 118.

Next, at step 310, the email application 106 computes an indexing power ($\pi_i$) for each n-gram $g_i$ in G by subtracting the normalized entropy $\varepsilon_i$ of the n-gram $g_i$ from a value of one (1). In this manner, step 310 effectively reverses the values of the n-grams $g_i$ in G such that those having a low normalized entropy $\varepsilon_i$ obtain a high indexing power $\pi_i$ (and hold high weight with respect to step 312 described below), and those having a high normalized entropy $\varepsilon_i$ obtain a low indexing power $\pi_i$ (and hold little weight with respect to step 312 described below).

Next, at step 312, the email application 106 ranks, in a list, all n-grams $g_i$ in G in decreasing order based on their indexing powers $\pi_i$, and truncates the list according to a threshold to produce a set (H) of remaining high-value n-grams $g_i$, denoted $H = \cup H_k$. For example, if the threshold has a value of one (1), only n-grams $g_i$ appearing in a single folder 118 are retained within the truncated list, and the rest—i.e., those appearing in more than one folder 118—are removed. It is noted that this threshold can be fine-tuned to achieve performance metrics that are suitable. Additionally, it is noted that the n-grams $g_i$ removed from the list—which are considered to be low-value n-grams $g_i$—can be stored in a separate list (X) and used at a later time to identify low-value n-grams in new emails 108 (described in greater detail below at step 406 of FIG. 4). In any case, $H_k$ refers to the remaining n-grams $g_i$ associated with the folder 118 $m_k$, such that each folder 118 $m_k$ is characterized by a relatively small set of high-value n-grams $H_k = \{h_{ik}\}$. Additionally, $N_k$ can represent the cardinality of $H_k$ (i.e., a count of high-value n-grams included in $H_k$).

Accordingly, at the conclusion of step 312, a respective set $H_k$ of high-value n-grams is established for each of the folders 118 $m_k$ in the set K of folders 118. As described in greater detail herein, step 312 can transition into a method 400 described below in conjunction with FIG. 4, which discloses a technique in which new emails 108 can be automatically sorted into folders 118 by utilizing the high-value n-grams described herein.

Figure 4:
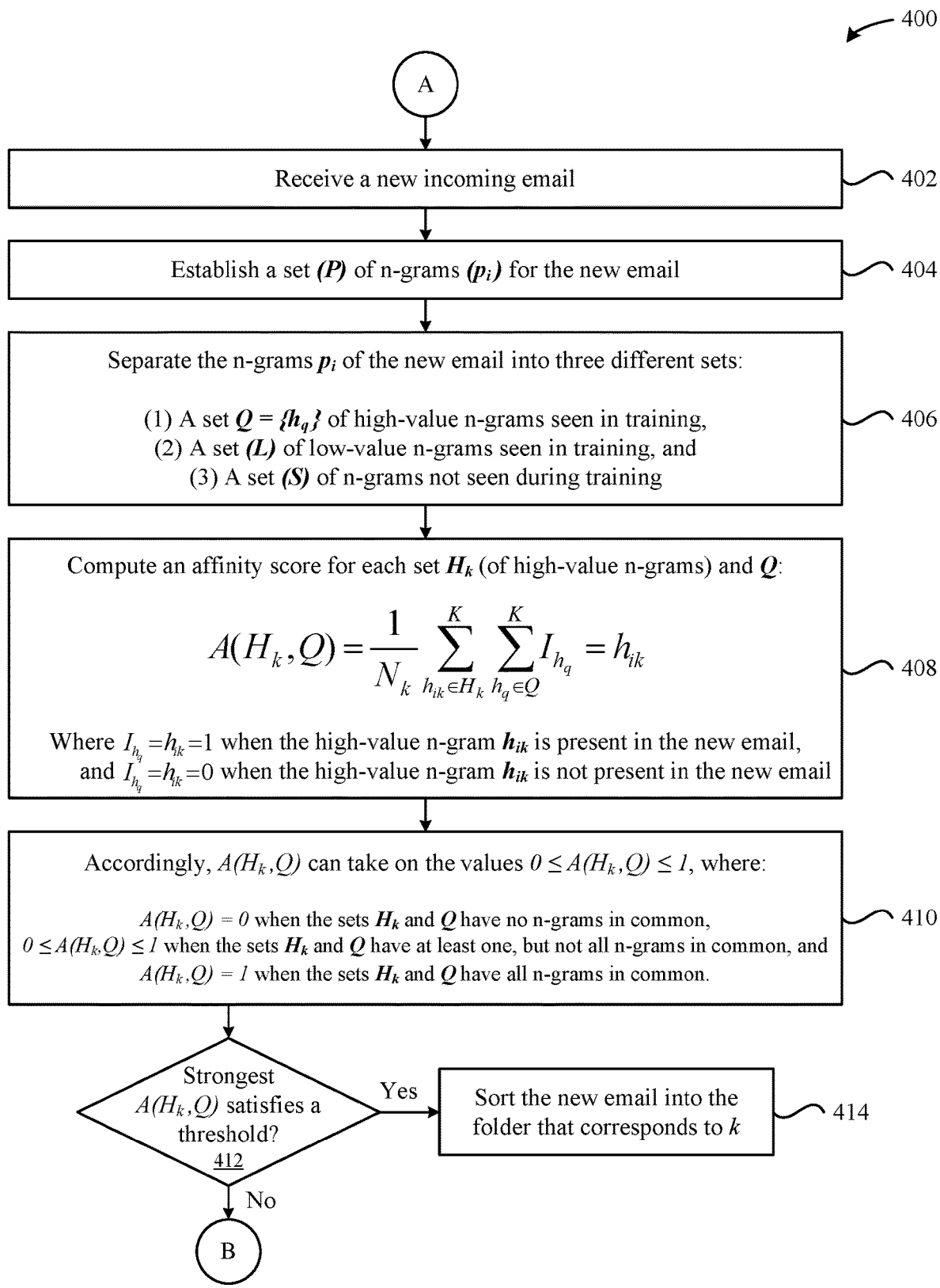
FIG. 4 illustrates a method for identifying an appropriate folder into which a new email can be sorted, according to some embodiments.

FIG. 4 illustrates a method 400 for identifying an appropriate folder 118 into which a new email 108 can be sorted, according to some embodiments. As shown in FIG. 4, the method 400 begins at step 402, where the email application 106 receives a new incoming email 108 (e.g., subsequent to the training process described herein being carried out at least one time). At step 404, the email application 106 establishes a set (P) of n-grams ($p_i$) for the new email 108, e.g., using the n-gram extraction techniques described above in conjunction with step 306 of FIG. 3.

At step 406, the email application 106 separates the n-grams $p_i$ into three different sets. According to some embodiments, a first set $Q = \{h_q\}$ of high-value n-grams seen in training can be established by calculating an intersection between the n-grams $p_i$ (of the new email 108) and each respective set $H_k$ of high-value n-grams for each of the folders 118 $m_k$. According to some embodiments, a second set (L) of low-value n-grams seen in training can be formed by calculating an intersection between the n-grams $p_i$ (of the new email 108) and the set X of low-value n-grams $g_i$ that were truncated from the ranked list (as described above in conjunction with step 312 of FIG. 3). Additionally, a third set (S) of n-grams not seen during training can be formed by calculating a relative complement of (1) (i) the respective set $H_k$ of high-value n-grams for each of the folders 118 $m_k$, and (ii) the set X of low-value n-grams $g_i$ that were truncated from the ranked list, with respect to (2) the set of n-grams $p_i$ (of the new email 108).

Next, at step 408, the email application 106 computes an affinity score $A(H_k,Q)$ for each set $H_k$ (of high value-n-grams) and Q using the equation illustrated within step 408 of FIG. 4. According to some embodiments, I{.} represents an indicator function that is assigned a value of one (1) when the high-value n-gram $h_{ik}$ is present in the new email 108, or is assigned a value of zero (0) when the high-value n-gram $h_{ik}$ is not present in the email 108. Accordingly, step 410 illustrates the different values that can be assigned to the affinity scores $A(H_k,Q)$ (by nature of the equation illustrated within step 408 of FIG. 4). In particular, $A(H_k,Q)$ can take on a value greater than or equal to zero (0), and less than or equal to one (1) (i.e., $0 \leq A(H_k,Q) \leq 1$). In particular, $A(H_k,Q)=0$ when the sets $H_k$ and Q have no n-grams in common. Moreover, $0 \leq A(H_k,Q) \leq 1$ when the sets $H_k$ and Q have at least one—but not all—n-grams in common. Further, $A(H_k,Q)=1$ when the sets $H_k$ and Q have all n-grams in common. In this manner, the folder 118 having the highest affinity score $A(H_k,Q)$ can be identified as a strongest candidate into which the new email 108 can be sorted.

Notably, the email application 106 can be configured to implement additional conditions to increase the overall accuracy by which the new email 108 is sorted into a particular folder 118. In particular, at step 412, the email application 106 can determine whether the strongest affinity score $A(H_k,Q)$ satisfies a particular threshold. For example, the threshold can be set at (0.5), such that the strongest affinity score $A(H_k,Q)$ must meet or exceed this threshold in order for the email application 106 to sort the email 108 into the folder 118 that corresponds to the strongest affinity score $A(H_k,Q)$. Accordingly, if, at step 412, the email application 106 determines that the strongest affinity score $A(H_k,Q)$ satisfies the threshold, then the method 400 proceeds to step 414, where the email application 106 sorts the email 108 into the folder 118 that corresponds to the strongest affinity score. Otherwise, the email application 106 avoids sorting the email 108 into any existing folder 118, and the method 400 proceeds to step 502 of FIG. 5, where, instead, the email application 106 potentially recommends the creation of a new folder 118 into which the email 108 can be sorted.

Figure 5:
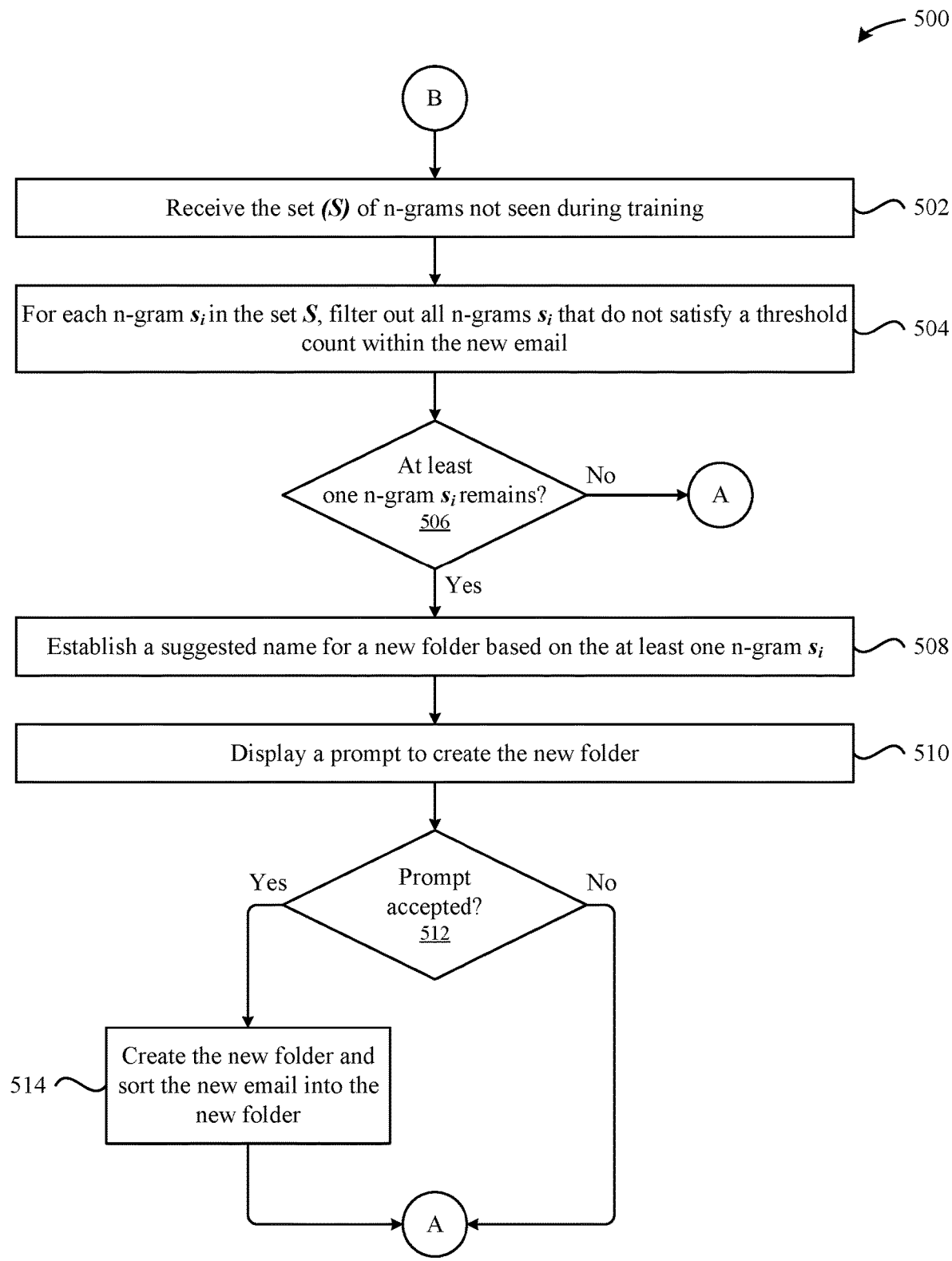
FIG. 5 illustrates a method for suggesting the creation of a new folder in response to receiving a new email, according to some embodiments.

FIG. 5 illustrates a method 500 for suggesting the creation of a new folder 118 in response to receiving the new email 108, according to some embodiments. As shown in FIG. 5, the method 500 begins at step 502, where the email application 106 receives the set (S) of n-grams (formed at step 406 of FIG. 4 described above) that are included in the email 108, but were not seen during the training process. At step 504, the email application 106 carries out the following technique: for each n-gram $s_i$ in the set S, filter out all n-grams $s_i$ that do not satisfy a threshold count within the new email 108. For example, when the threshold count is set to two (2), any n-gram $s_i$ that occurs fewer than two times within the new email 108 is disregarded by the email application 106. In this manner, the email application 106 can avoid presenting poor recommendations to create folders 118 based on singular/low-instance n-grams $s_i$ identified within the new email 108. Accordingly, at step 506, the email application 106 determines whether at least one n-gram $s_i$ remains (subsequent to the filtering performed at step 504). If, at step 506, the email application 106 determines that at least one n-gram $s_i$ remains, then the method 500 proceeds to step 508. Otherwise, the method 500 can proceed back to step 402 of FIG. 4, where the email application 106 waits to process additional new emails 108 that are received.

At step 508, the email application 106 establishes a suggested name for a new folder 118 based on the at least one n-gram $s_i$. According to some embodiments, the suggested name can be presented in a pop-up window within the email application 106 (e.g., as described below in conjunction with FIGS. 6G-6H). According to some embodiments, the suggested name for the new folder 118 can be based, in any manner, on the at least one n-gram $s_i$. For example, when a single n-gram $s_i$ remains, the name can be based on the words included in the single n-gram $s_i$. In another example, when two or more n-grams $s_i$ remain, the name can be based on a combination of the words included in the two or more n-grams $s_i$. It is noted that additional approaches/considerations can be made. For example, the email application 106 can reference a list of popular n-grams that are linked to suggested names for folders 118 that provide additional clarity beyond the words included in the n-grams. For example, if a single n-gram $s_i$ remains, and includes the words "Paris Vacation", the email application 106 can identify that the term "Paris" refers to a locale, and "Vacation" refers to movement, and present a generic name suggestion for the new folder 118 such as "Travel". Additionally, it is noted that other considerations can be made when suggesting names for folders 118, including analyzing the names of other folders 118 already managed by the email application 106 to avoid overlapping names, identifying terms that indicate related/follow-up new emails 118 are likely to be received (e.g., "thread", "subscription", "reply", "loop", "let me know", etc.), and so on.

In any case, at step 510, the email application 106 displays a prompt to create the new folder 118. It is noted that a more detailed example of the prompt—and the manner in which it can be presented—is described below in conjunction with FIGS. 6G-6H. At step 512, the email application 106 determines whether the prompt is accepted (e.g., by way of a received user input). If, at step 512, the email application 106 determines that prompt is accepted, then the method 500 proceeds to step 514, where the email application 106 creates the new folder 118 and sorts the new email 108 into the new folder 118. Otherwise, the method 500 can proceed back to step 402 of FIG. 4, where the email application 106 waits to process additional new emails 108 that are received.

Figure 6A:
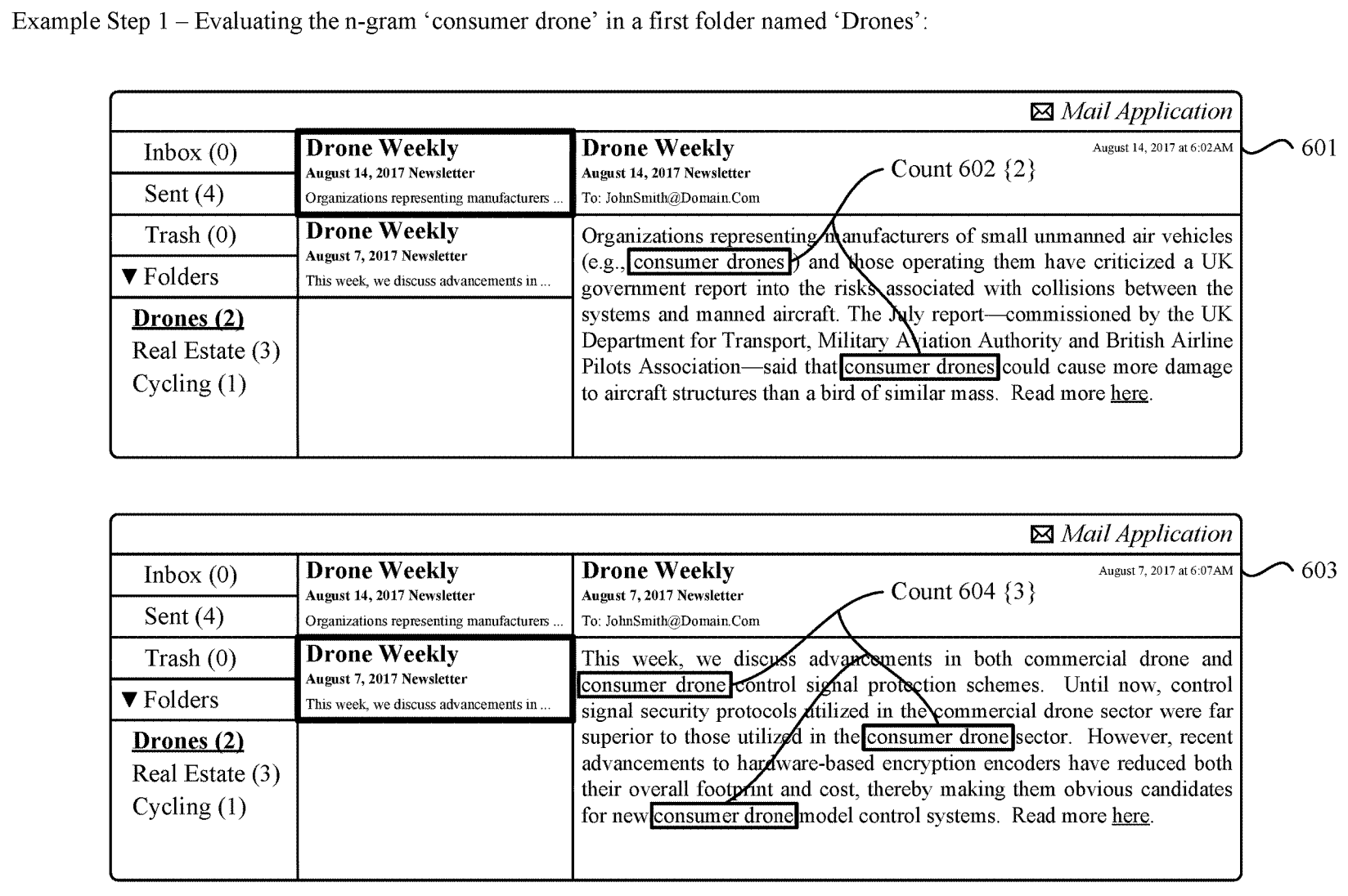
Figure 6D:
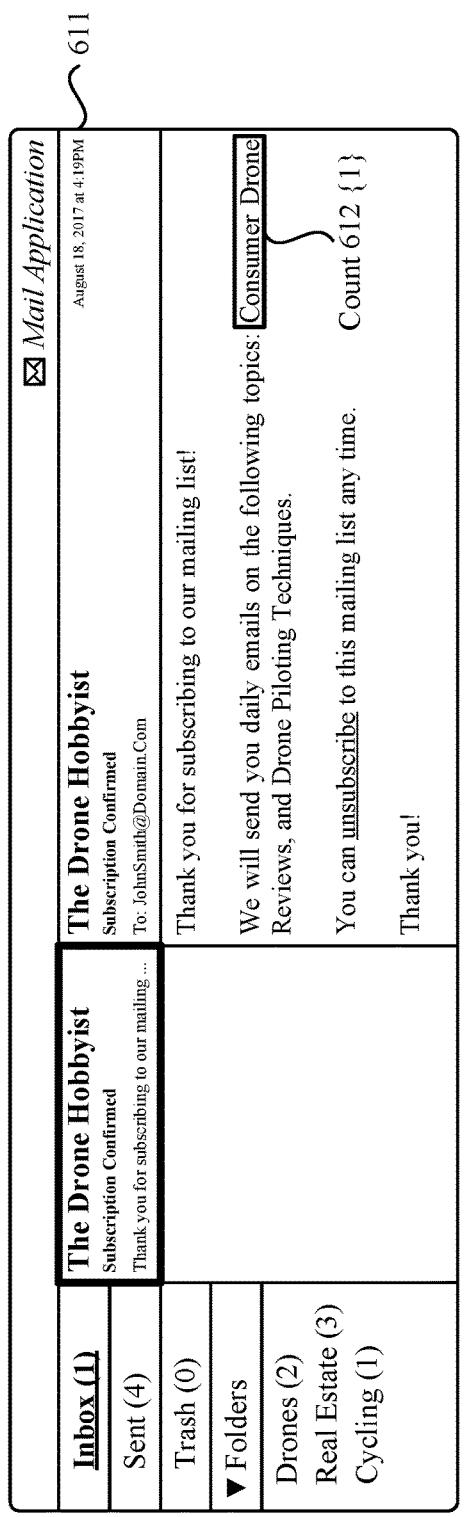

Accordingly, FIGS. 3-5 provide a detailed breakdown of how the training, sorting, and new folder suggestion processes described herein can interact with one another and be carried out. To provide further understanding, FIGS. 6A-6H illustrate conceptual diagrams of example scenarios in which the various training, sorting, and new folder suggestion processes described herein can be practiced, according to some embodiments. In particular, FIGS. 6A-6C illustrate a training process carried out against example existing emails 108/folders 118 managed by the email application 106, FIGS. 6D-6F illustrated a sorting process carried out against an example new email 108 received by the email application 106, and FIGS. 6G-6H illustrate a new folder suggestion process carried out against an example new email 108 received by the email application 106. It is noted that the various scenarios illustrated in conjunction with FIGS. 6A-6H are merely exemplary, and that the email application 106 can be configured to manage any number of emails 108/folders 118 without departing from the scope of this disclosure. Moreover, it is noted that the various depicted user interfaces of the email application 106 are exemplary, and that they can be modified in any fashion without departing from the scope of this disclosure.

As shown in FIG. 6A, a first step can involve the email application 106 carrying out a training process (as described herein) against existing emails 108/folders 118 managed by the email application 106. In the example illustrated in FIG. 6A, five emails 108 are sorted across three different folders 118: "Drones", "Real Estate", and "Cycling". In particular, two emails 108 are sorted into the folder 118 "Drones", three emails 108 are sorted into the folder 118 "Real Estate", and one email 108 is sorted into the folder 118 "Cycling". Thus, the training process described in conjunction with FIGS. 6A-6C can take place after at least a small amount of information is managed by the email application 106 and can be analyzed to effectively perform the sorting/new folder suggestion techniques described herein.

As shown in FIG. 6A, the first step can involve extracting n-grams from the five emails 108 stored in the folders 118. In the interest of simplification, the illustrations/following disclosures will focus on a particular two-word n-gram: "consumer drone". However, it will be understood from the remainder of this disclosure that the same procedures can be carried out against all n-grams associated with the emails 108 in accordance with the n-gram bounds that are implemented by the email application 106. For example, with respect to the user interface 601 in FIG. 6A, n-grams sized to one word would include {"organizations", "representing", "manufacturers", "of", "small", . . . }. Continuing with this example, n-grams sized to two words would include {"organizations representing", "representing manufacturers", "manufacturers of", . . . }. Continuing with this example, n-grams sized to three words would include {"organizations representing manufacturers", "representing manufacturers of", "manufacturers of small", . . . }. Continuing further with this example, n-grams sized to four words would include {"organizations representing manufacturers of", "representing manufacturers of small", "manufacturers of small unmanned", . . . }, and so on.

It is noted that the email application 106 can take into account certain aspects of words included in the n-grams as they are extracted from the different emails 108. For example, the email application 106 can be configured to identify words that exist in plural form, and instead take into account only their base form. For example, when the email application 106 encounters the n-gram "consumer drone" and the n-gram "consumer drones", the email application 106 can consider them to be synonymous, thereby increasing the overall accuracy of the sorting/new folder recommendation processes described herein. In another example, the email application 106 can be configured to ignore various aspects of words included in n-grams, including the case (i.e., lowercase/uppercase) of the letters that make up the words, numbers included among the letters, punctuation (e.g., periods, exclamation points, etc.), special characters, spaces, and so on.

In any case, the n-gram "consumer drone" appears two times within a body of the first email 108 stored in the folder 118 "Drones", as indicated by the count 602 within the user interface 601 in FIG. 6A. Moreover, the n-gram "consumer drone" appears three times within a body of the second email 108 stored in the folder 118 "Drones", as indicated by the count 604 within the user interface 603 in FIG. 6A. Turning now to FIG. 6B, an extension of the first step involves analyzing the emails 108 included in the folders 118 "Real Estate" and "Cycling". As indicated by the count 608 shown in the user interface 607 FIG. 6B, the n-gram "consumer drone" is not associated with any of the three emails 108 stored in the folder 118 "Real Estate". Moreover, as indicated by the count 610 shown in the user interface 609 of FIG. 6B, the n-gram "consumer drone" is not associated with the email 108 stored in the folder 118 "Cycling". Accordingly, at the conclusion of the first step, the email application 106 determines that the n-gram "consumer drone" occurs five times in total across the five emails 108 stored across the three folders 118. In that regard, the normalized entropy c for the n-gram "consumer drone" should be equal to zero (0), as this n-gram appears across only a single folder (as described above in conjunction with step 308 of FIG. 3).

To illustrate this notion, a second step illustrated in FIG. 6C provides a breakdown of how the n-gram "consumer drone" can be processed in accordance with the normalized entropy equation illustrated within step 308 of FIG. 3. For example, as shown in FIG. 6C, the normalized entropy c for the n-gram "consumer drone" amounts to a value of zero (0) when the various parameters—e.g., three (3) total folders 118, five (5) total instances of the n-gram "consumer drone", etc.—are applied within the normalized entropy equation. In turn, the email application 106 can carry out a third step that involves calculating an indexing power π for the n-gram "consumer drone" based on the normalized entropy ε. As previously described above in conjunction with step 310 of FIG. 3—and, as illustrated in FIG. 6C—the email application 106 can calculate the indexing power π for the normalized entropy ε of the n-gram "consumer drone" by subtracting the normalized entropy ε from the value of one (1). In turn, the indexing power π for the n-gram "consumer drone" obtains a strong value of one (1). Next, a fourth step illustrated in FIG. 6C involves establishing a set H of high-value n-grams for the folder 118 "Drones", which includes the n-gram "consumer drone". It is noted that this fourth step encapsulates the ranking/truncating techniques described above in conjunction with step 312, where the n-gram "consumer drone" remains after the truncation carried out by the email application 106. Additionally, and as illustrated in FIG. 6C, the cardinality (i.e., count) of the set H of high-value n-grams for the folder 118 "Drones" is equal to one, as the set H includes only the single high-value n-gram "consumer drone".

Accordingly, at the conclusion of the fourth step of FIG. 6C—and, in accordance with the example scenario—a set H of high-value n-grams is established for each of the folders 118 "Drones", "Real Estate", "Cycling", but only the set H associated with the folder 118 "Drones" includes any high-value n-grams. In other words, the respective sets H for the folders 118 "Real Estate" and "Cycling" are empty. Importantly, it is noted that in the interest of simplifying this disclosure, the example scenario illustrated in FIGS. 6A-6H—as well as the accompanying description provided herein—intentionally disregards n-grams that might typically be included in the respective sets H for the folders 118 "Drones", "Real Estate" and "Cycling". For example, in actual practice, the set H of high-value n-grams for the folder 118 "Drones" might also include the high-value n-gram "drone weekly", the set H of high-value n-grams for the folder 118 "Real Estate" might include the high-value n-gram "open house", while the set H of high-value n-grams for the folder 118 "Cycling" might include the high-value n-gram "road bike".

In any case, the training process is complete at the conclusion of the fourth step of FIG. 6C, and the email application 106 is capable of implementing the sorting/new folder suggestion techniques in response to receiving new emails 108. Accordingly, FIGS. 6D-6H extend the scenarios described above in conjunction with FIGS. 6A-6C, and will now be described below in greater detail.

FIG. 6D illustrates a fifth step that involves carrying out a sorting process in response to receiving a new email 108 that includes the n-gram "consumer drone". In the example illustrated in FIG. 6D, the new email 108 is delivered into a generic "Inbox" folder 118, as the new email 108 has not yet been processed in accordance with the sorting/new folder suggestion processes set forth herein. As shown in the user interface 611 of FIG. 6D, the n-gram "consumer drone" occurs one (1) time within a body of the new email 108, which is represented by the count 612. Again, it is noted that the email application 106 will process the new email 108 to extract other n-grams, but such details have been omitted from the example scenarios illustrated in FIGS. 6A-6H for the purpose of simplifying this disclosure.

Next, a sixth step in FIG. 6D can involve the email application 106 identifying that the n-gram "consumer drone" within the new email 108 is a high-value n-gram, and adding the n-gram "consumer drone" to the set Q of high-value n-grams associated with the email 108 (e.g., as described above in conjunction with step 406 of FIG. 4). Although not illustrated in FIG. 6D, the sixth step can also involve the email application 106 identifying a set L of low-value n-grams included in the new email 108 (and seen in training), as well as a set S of n-grams included in the new email 108 (and not seen during training) (as also described above in conjunction with step 406 of FIG. 4). Accordingly, at the conclusion of the sixth step, the email application 106 determines that the n-gram "consumer drone" is the only n-gram included in the set Q of high-value n-grams associated with the new email 108. In that regard, the email application 106 should identify that the folder 118 "Drones" is associated with a strongest affinity score relative to the other folders 118 ("Real Estate" and "Cycling"). To illustrate this notion, a seventh step illustrated in FIG. 6E provides a breakdown of how the folder 118 "Drones" receives the highest affinity score relative to the other folders 118.

As shown in FIG. 6E, the affinity score $A(H_k, Q)$ for the folder 118 "Drones" amounts to a value of one (1) when the various parameters are applied within the affinity score equation. For example, $N_k$—which represents the cardinality of the set Q—has a value of one (1) for the folder 118 "Drones", and the indicator function I{.} has a value of one because the high-value n-gram "consumer drone" is present in the new email 108. In contrast, and as further shown in FIG. 6E, the affinity scores $A(H_k, Q)$ for the folders 118 "Real Estate" and "Cycling" amount to zero (0), as both the cardinalities $N_k$ of their respective sets Q/indicator functions I{.} have values of zero (0). Accordingly, at the conclusion of FIG. 6E, the email application 106 can identify, among the affinity scores $A(H_k, Q)$ of the folders 118, that the folder 118 "Drones" is the strongest candidate folder into which the new email 108 can be sorted. Additionally, and as previously described herein, the email application 106 can further determine whether the strongest affinity score $A(H_k, Q)$ satisfies a threshold. This can help enhance the overall accuracy of the techniques described herein, as the email application 106 can choose to forego sorting the new email 108 into a folder 118 when no strong candidates are identified.

Accordingly, upon identifying that the folder 118 "Drones" is an acceptable candidate folder 118, the email application 106 can carry out an eight step (illustrated by the user interface 613 of FIG. 6F), which involves routing the new email 108 into the folder 118 "Drones". It is noted that a variety of approaches can be utilized to ensure user satisfaction is maintained when implementing the sorting process described herein. For example, the email application 106 can display a prompt prior to sorting the new email 108 so that a user can confirm that it is appropriate to sort the new email 108 into the folder 118 "Drones". In another example, the email application 106 can display a non-intrusive alert to indicate that the new email 108 has been sorted into the folder 118 "Drones" so that the new email 108 is not missed by the user. It is noted that any form of user interface can be implemented to enable users to interact with the email application 106 in manner that melds well with the training, sorting, and new folder suggestion processes without departing from the scope of this disclosure.

Additionally, it is noted that the email application 106 can be configured to enable a new email 108 to be sorted into two or more folders 118 when appropriate conditions are met. For example, the email application 106 can identify that the affinity scores for two or more folders 118 satisfy a threshold value, and present an option to sort the new email 108 into the two or more folders 118. For example, the email application 106 can display a prompt that ranks the two or more folders 118 based on their affinity scores. In turn, a user can select a subset of the two or more folders 118 (e.g., using checkboxes) into which the new email 108 should be sorted. In another example, the email application 106 can automatically sort the new email 108 into at least one folder of the two or more folders 118 (e.g., based on user settings). For example, the user settings can dictate that the new email 108 should be sorted into any folder 118 having an affinity score that satisfies a threshold value, the top N folders that satisfy the threshold value, and so on. According to some embodiments, when sorting the new email 108 into two or more folders 118, individual copies of the new email 108 can be established and sorted into each folder 118 of the two or more folders 118. In other embodiments, references to the new email 108 can be established within each folder 118 of the two or more folders 118 to reduce storage space consumption and increase efficiency. For example, the new email 108 can be sorted into the folder 118 having the highest affinity score, and references to the new email 108 can be placed into the other folders 118 into which the new email 108 is sorted. In any case, the techniques set forth herein can beneficially enable a new email 108 to be sorted into two or more folders 118 when appropriate, thereby enhancing overall flexibility and increasing user satisfaction.

Additionally, FIGS. 6G-6H set forth an example scenario in which the email application 106 receives another new email 108, but is unable to identify any candidate folder 118 into which the new email 108 should be sorted. In particular, and as shown in the ninth step of FIG. 6G, the new email 108 does not include any instances of n-grams that otherwise would cause the email application 106 to identify one of the folders 118 "Drones", "Real Estate", and "Cycling". However, the email application 106 extracts an n-gram "Mexico trip" that occurs four different times within the subject line/body of the new email 108, as indicated by the count 616 illustrated within the user interface 615 of FIG. 6G. In turn, the email application 106 can verify that the n-gram "Mexico trip" occurs within the new email 108 a threshold number of times (e.g., as described above in conjunction with step 504 of FIG. 5). In response, and as shown in the user interface 617 of FIG. 6G, the email application 106 can, at a tenth step, display a new folder suggestion prompt. As shown in FIG. 6G, and as previously described above in conjunction with step 504 of FIG. 5, the new folder suggestion prompt can include a recommended name—"Mexico Trip"—for the new folder 118 that potentially will be created. Additionally, the new folder suggestion prompt can enable the user to modify the name of the new folder 118 if desired. Additionally, the new folder suggestion prompt can enable the user to deny the creation of the new folder 118 if desired. Further, the new folder suggestion prompt can enable the user to adjust various settings associated with the new folder suggestion process, including disabling the process altogether, establishing folder naming convention rules, and so on.

Finally, turning now to FIG. 6H, an eleventh step can involve the email application 106 receiving an approval to create the new folder 118 "Mexico Trip" (as illustrated in the user interface 619). In turn, the email application 106 creates the new folder 118, and, at a twelfth step, routes the new email 108 into the new folder 118 "Mexico Trip" (as illustrated in the user interface 621).

It is noted that the various embodiments set forth herein primarily involve a single computing device—e.g., the computing device 102—that is configured to carry out the email sorting techniques described herein. However, it is noted that all or a portion of the email sorting techniques can be offloaded by the computing device 102 to one or more other computing devices without departing from the scope of this disclosure. For example, the computing device 102 (e.g., a smartphone device) can be configured to offload all or a portion of the email sorting techniques to another computing device 102 (e.g., a tablet device) that is known to the computing device 102. In another example, the computing device 102 can be configured to offload all or portion of the email sorting techniques to a server device with which the computing device 102 can interface. In any case, the computing device 102 can provide relevant information to the assisting computing device(s) to enable all or a portion of the sorting techniques to be performed on behalf on the computing device 102. According to some embodiments, the information can be protected (e.g., obfuscated, encrypted, etc.) so that it is not delivered to the assisting computing device(s) in plaintext form. In any case, when all or a portion of the sorting techniques are performed outside of the computing device 102, relevant information associated with the sorting can be delivered back to the computing device 102. In turn, the computing device 102 can carry out the appropriate updates to reflect the information—e.g., sorting new emails into existing folders, creating new folders, etc.—thereby rendering the same or similar results to the techniques described herein.

Figure 7:
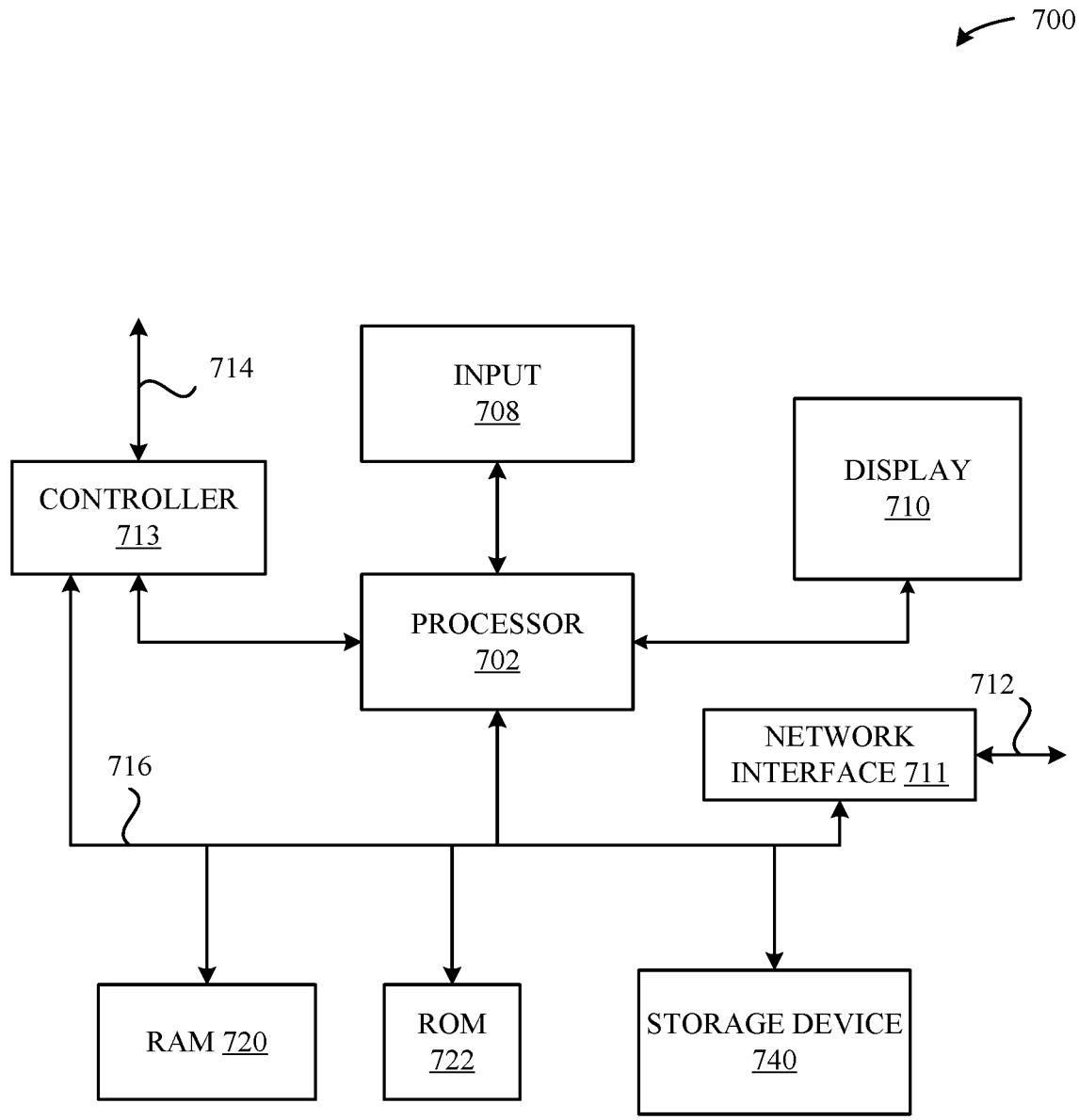
FIG. 7 illustrates a detailed view of a computing device that can represent the computing devices of FIG. 1 used to implement the various techniques described herein, according to some embodiments.

FIG. 7 illustrates a detailed view of a computing device 700 that can represent the computing devices of FIG. 1 used to implement the various techniques described herein, according to some embodiments. For example, the detailed view illustrates various components that can be included in the computing device 102 described in conjunction with FIG. 1. As shown in FIG. 7, the computing device 700 can include a processor 702 that represents a microprocessor or controller for controlling the overall operation of the computing device 700. The computing device 700 can also include a user input device 708 that allows a user of the computing device 700 to interact with the computing device 700. For example, the user input device 708 can take a variety of forms, such as a button, keypad, dial, touch screen, audio input interface, visual/image capture input interface, input in the form of sensor data, and so on. Still further, the computing device 700 can include a display 710 that can be controlled by the processor 702 (e.g., via a graphics component) to display information to the user. A data bus 716 can facilitate data transfer between at least a storage device 740, the processor 702, and a controller 713. The controller 713 can be used to interface with and control different equipment through an equipment control bus 714. The computing device 700 can also include a network/bus interface 711 that couples to a data link 712. In the case of a wireless connection, the network/bus interface 711 can include a wireless transceiver.

As noted above, the computing device 700 also includes the storage device 740, which can comprise a single disk or a collection of disks (e.g., hard drives). In some embodiments, storage device 740 can include flash memory, semiconductor (solid state) memory or the like. The computing device 700 can also include a Random-Access Memory (RAM) 720 and a Read-Only Memory (ROM) 722. The ROM 722 can store programs, utilities or processes to be executed in a non-volatile manner. The RAM 720 can provide volatile data storage, and stores instructions related to the operation of applications executing on the computing device 700.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for automatically sorting emails into one or more folders managed by an email application, the method comprising:
   receiving a new email;
   establishing a first set of n-grams based on the new email;
   establishing, for the new email, a set of high-value n-grams based on an intersection of (i) the first set of n-grams based on the new email, and (ii) the respective sets of high-value n-grams for the one or more folders;

establishing, for each folder, a respective affinity score based on (i) the respective set of high-value n-grams for the folder, and (ii) the set of high-value n-grams for the new email;

identifying a target folder among the one or more folders having a strongest affinity score; and in response to identifying that the strongest affinity score satisfies a second threshold value:

associating the new email with the target folder.

2. The method of claim 1, further comprising, prior to receiving the new email:

accessing a plurality of emails, wherein each email is included in a respective folder of the one or more folders;

establishing a second set of n-grams based on the plurality of emails;

for each n-gram in the second set of n-grams:

calculating a respective normalized entropy for the n-gram, and calculating a respective indexing power for the n-gram based on its respective normalized entropy;

ranking the n-grams based on their respective indexing powers to establish a ranked list of n-grams; and establishing, for each folder of the one or more folders, a respective set of high-value n-grams based on the ranked list of n-grams.

3. The method of claim 2, wherein the respective normalized entropy for each n-gram is based on (i) a count of the one or more folders, and (ii) a sum, for each folder of the one or more folders, of: a first number of times the n-gram occurs in emails belonging to the folder relative to a second number of times the n-gram occurs within each email of the plurality of emails.

4. The method of claim 2, wherein the respective indexing power for each n-gram is based on subtracting the respective normalized entropy for the n-gram from a value of one.

5. The method of claim 2, further comprising, subsequent to establishing the ranked list of n-grams:

truncating the ranked list of n-grams in accordance with a first threshold value to cause at least one n-gram to be removed from the ranked list of n-grams.

6. The method of claim 5, further comprising:

storing the at least one n-gram in a set of low-value n-grams.

7. The method of claim 2, wherein each n-gram comprises one to N words derived from a subject, a body, or an attachment of at least one email of the plurality of emails.

8. The method of claim 1, further comprising, in response to identifying that the strongest affinity score does not satisfy the second threshold value:

establishing a third set of n-grams based on a relative complement of (1) (i) the respective sets of high-value n-grams for the one or more folders, and (ii) the set of low-value n-grams, with respect to (2) the second first set of n-grams based on the new email, wherein the third set of n-grams includes one or more n-grams; and in response to identifying, among the one or more n-grams, that at least one n-gram of the one or more n-grams is observed within the new email a number of times that satisfies a third threshold value:

issuing a prompt to create a new folder into which the new email can be placed, wherein the new folder is based on the at least one n-gram.

9. The method of claim 8, further comprising:

in response to receiving an approval in association with the prompt:

creating the new folder, and associating the new email with the new folder; or in response to receiving a refusal in association with the prompt:

retaining the new email in a default folder into which new emails are placed.

10. At least one non-transitory computer readable storage medium configured to store instructions that, when executed by at least one processor included in a computing device, cause the computing device to automatically sort emails into one or more folders managed by an email application, by carrying out steps that include:

receiving a new email;

establishing a first set of n-grams based on the new email;

establishing, for the new email, a set of high-value n-grams based on an intersection of (i) the first set of n-grams based on the new email, and (ii) the respective sets of high-value n-grams for the one or more folders;

establishing, for each folder, a respective affinity score based on (i) the respective set of high-value n-grams for the folder, and (ii) the set of high-value n-grams for the new email;

identifying a target folder among the one or more folders having a strongest affinity score; and in response to identifying that the strongest affinity score satisfies a second threshold value:

associating the new email with the target folder.

11. The at least one non-transitory computer readable storage medium of claim 10, wherein the steps further include, prior to receiving the new email:

accessing a plurality of emails, wherein each email is included in a respective folder of the one or more folders;

establishing a second set of n-grams based on the plurality of emails;

for each n-gram in the second set of n-grams:

calculating a respective normalized entropy for the n-gram, and calculating a respective indexing power for the n-gram based on its respective normalized entropy;

ranking the n-grams based on their respective indexing powers to establish a ranked list of n-grams; and establishing, for each folder of the one or more folders, a respective set of high-value n-grams based on the ranked list of n-grams.

12. The at least one non-transitory computer readable storage medium of claim 11, wherein the respective normalized entropy for each n-gram is based on (i) a count of the one or more folders, and (ii) a sum, for each folder of the one or more folders, of: a first number of times the n-gram occurs in emails belonging to the folder relative to a second number of times the n-gram occurs within each email of the plurality of emails.

13. The at least one non-transitory computer readable storage medium of claim 11, wherein the respective indexing power for each n-gram is based on subtracting the respective normalized entropy for the n-gram from a value one.

14. The at least one non-transitory computer readable storage medium of claim 11, wherein the steps further include, subsequent to establishing the ranked list of n-grams:

truncating the ranked list of n grams in accordance with respect a first threshold value to cause at least one n-gram to be removed from the ranked list of n-grams.

15. The at least one non-transitory computer readable storage medium of claim 10, wherein the steps further include, in response to identifying that the strongest affinity score does not satisfy the second threshold value:

establishing a third set of n-grams based on a relative complement of (1) (i) the respective sets of high-value n-grams for the one or more folders, and (ii) the set of low-value n-grams, with respect to (2) the first set of n-grams based on the new email, wherein the third set of n-grams includes one or more n-grams; and in response to identifying, among the one or more n-grams, that at least one n-gram of the one or more n-grams is observed within the new email a default number of times that satisfies a third threshold value:

issuing a prompt to create a new folder into which the new email can be placed, wherein the new folder is based on the at least one n-gram.

16. A computing device configured to automatically sort emails into one or more folders managed by an email application, the computing device comprising:

at least one processor;

and at least one memory storing instructions that, when executed by the at least one processor, cause the computing device to:

receive a new email;

establish a first set of n-grams based on the new email;

establish, for the new email, a set of high-value n-grams based on an intersection of (i) the first set of n-grams based on the new email, and (ii) the respective sets of high-value n-grams for the one or more folders;

establish, for each folder a respective affinity score based on (i) the respective set of high-value n-grams for the folder, and (ii) the set of high-value n-grams for the new email;

identify a target folder among the one or more folders having a strongest affinity score; and in response to identifying that the strongest affinity score satisfies a second threshold value:

associate the new email with the target folder.

17. The computing device of claim 16, wherein the at least one processor further causes the computing device to, prior to receiving the new email:

accessing a plurality of emails, wherein each email is included in a respective folder of the one or more folders;

establishing a second set of n-grams based on the plurality of emails;

for each n-gram in the second set of n-grams:

calculating a respective normalized entropy for the n-gram, and calculating a respective indexing power for the n-gram based on its respective normalized entropy;

ranking the n-grams based on their respective indexing powers to establish a ranked list of n-grams; and establishing, for each folder of the one or more folders, a respective set of high-value n-grams based on the ranked list of n-grams.

18. The computing device of claim 17, wherein the respective normalized entropy for each n-gram is based on (i) a count of the one or more folders, and (ii) a sum, for each folder of the one or more folders, of: a first number of times the n-gram occurs in emails belonging to the folder relative to a second number of times the n-gram occurs within each email of the plurality of emails.

19. The computing device of claim 17, wherein the respective indexing power for each n-gram is based on subtracting the respective normalized entropy for the n-gram from a value of one.

20. The computing device of claim 17, wherein the at least one processor further causes the computing device to, in response to identifying that the strongest affinity score does not satisfy the second threshold value:

establish a third set of n-grams based on a relative complement of (1) (i) the respective sets of high-value n-grams for the one or more folders, and (ii) the set of low-value n-grams, with respect to (2) the first set of n-grams based on the new email, wherein the third set of n-grams includes one or more n-grams; and in response to identifying, among the one or more n-grams, that at least one n-gram of the one or more n-grams is observed within the new email a number of times that satisfies a third threshold value:

issue a prompt to create a new folder into which the new email can be placed, wherein the new folder is based on the at least one n-gram.

* * * * *